(12) United States Patent
Hoshino

(10) Patent No.: US 6,285,891 B1
(45) Date of Patent: *Sep. 4, 2001

(54) RADIO COMMUNICATION APPARATUS HAVING A PLURALITY OF COMMUNICATION FUNCTIONS

(75) Inventor: Masaki Hoshino, Yokohama (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,320

(22) Filed: Mar. 18, 1998

(30) Foreign Application Priority Data

Mar. 18, 1997 (JP) .................................... 9-064709

(51) Int. Cl.[7] ...................................... H04Q 7/20
(52) U.S. Cl. ........................... 455/567; 455/550; 455/570
(58) Field of Search ................................ 455/550, 73, 569, 455/570, 572, 412, 414, 418, 567, 564, 63; 345/354

(56) References Cited

U.S. PATENT DOCUMENTS

| | | | |
|---|---|---|---|
| 5,303,288 | * | 4/1994 | Duffy et al. ........................... 455/564 |
| 5,416,829 | * | 5/1995 | Umemoto ............................... 455/553 |
| 5,479,476 | * | 12/1995 | Finke-Anlauff ........................ 455/418 |
| 5,594,778 | * | 1/1997 | Schaupp, Jr. et al. ................ 455/418 |
| 5,606,597 | * | 2/1997 | Newland ................................ 455/464 |
| 5,734,987 | * | 3/1998 | Shioni et al. .......................... 455/570 |
| 5,786,819 | * | 7/1998 | Weiser et al. .......................... 345/354 |
| 5,835,863 | * | 11/1998 | Ikenouchi et al. .................... 455/567 |
| 5,867,793 | * | 2/1999 | Davis ..................................... 455/566 |
| 5,870,684 | * | 2/1999 | Hoashi et al. ......................... 455/567 |
| 5,901,365 | * | 5/1999 | Yasuda et al. ......................... 455/564 |
| 5,903,819 | * | 5/1999 | Rosemburg ............................ 455/63 |
| 5,903,852 | * | 5/1999 | Schaupp, Jr. et al. ................ 455/564 |
| 5,903,853 | * | 5/1999 | Sano ...................................... 455/570 |
| 5,966,655 | * | 10/1999 | Hardouin ............................... 455/418 |
| 6,006,114 | * | 12/1999 | Seppanen et al. .................... 455/567 |
| 6,047,195 | * | 4/2000 | Nakanishi ............................. 455/552 |

FOREIGN PATENT DOCUMENTS

| | | |
|---|---|---|
| 2310567 | 8/1997 | (GB) . |
| 6510646 | 11/1994 | (JP) . |
| 9004841 | 5/1990 | (WO) . |

* cited by examiner

*Primary Examiner*—Nay Maung
(74) *Attorney, Agent, or Firm*—Connolly Bove Lodge & Hutz LLP

(57) ABSTRACT

A radio communication apparatus has a plurality of communication functions such as an incoming call sound, an incoming call ringing pattern, an incoming call vibration, a received voice volume, a microphone sensibility, a noise canceling, a key confirming sound and a message recording, and a plurality of operation conditions of the communication functions are stored in a operation condition storing unit for each of a plurality of operation modes suitable for various environments. When a user selects a particular operation mode suitable for user's environment by pushing a mode selecting button, particular operation conditions of the communication functions corresponding to the particular operation mode are read out, and communication functions of a speaker, a vibrator, a buzzer, a noise canceler, a microphone and a message recorder are simultaneously set to the particular operation conditions. Therefore, when an incoming call and a caller's voice are received, the incoming call is rung at a pattern and a sound volume suitable for the user's environment, and the caller's voice is output at a sound volume suitable for the user's environment.

12 Claims, 7 Drawing Sheets

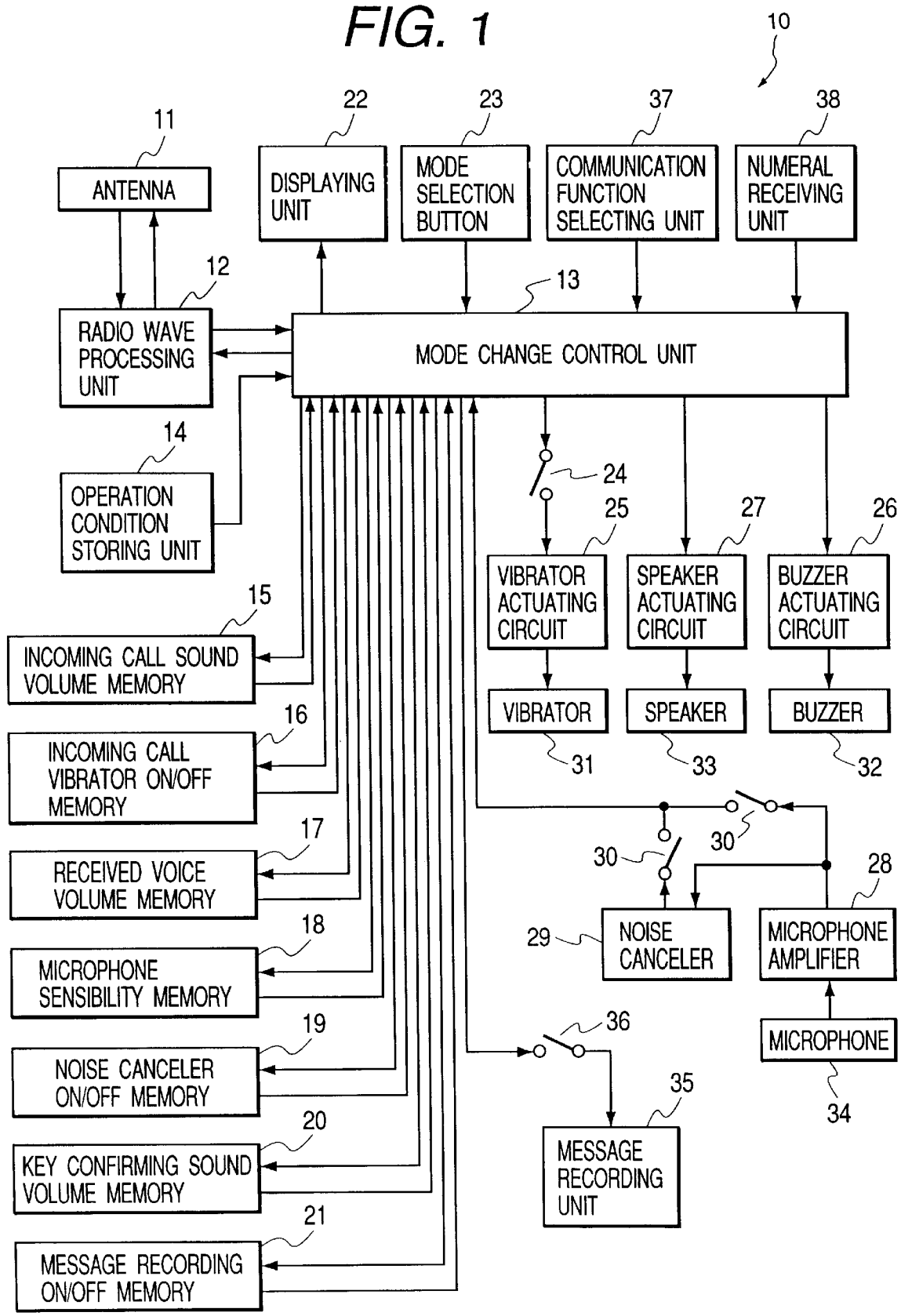

FIG. 2

| OPERATION MODE / COMMUNICATION FUNCTION | NORMAL OPERATION MODE | ELECTRIC TRAIN MODE | CAR MODE | HOME MODE | AMUSEMENT CENTER MODE | LIBRARY MODE | USER MODE |
|---|---|---|---|---|---|---|---|
| INCOMING CALL SOUND VOLUME | SET BY USER | MUTE | LOW | LOW | TOP | MUTE | SET BY USER |
| INCOMING CALL RINGING PATTERN | SET BY USER | — | PATTERN 1 | PATTERN 1 | PATTERN 1 | — | SET BY USER |
| INCOMING CALL VIBRATION | SET BY USER | ON | OFF | OFF | ON | ON | SET BY USER |
| RECEIVED VOICE VOLUME | SET BY USER | TOP | TOP | ORDINARY | TOP | ORDINARY | SET BY USER |
| MICROPHONE SENSIBILITY | SET BY USER | HIGH | HIGH | LOW | HIGH | HIGH | SET BY USER |
| NOISE CANCELING | SET BY USER | ON | ON | OFF | ON | OFF | SET BY USER |
| KEY CONFIRMING SOUND VOLUME | SET BY USER | MUTE | LOW | LOW | TOP | MUTE | SET BY USER |
| MESSAGE RECORDING | SET BY USER | OFF | ON | ON | ON | OFF | SET BY USER |

RADIO COMMUNICATION APPARATUS HAVING A PLURALITY OF COMMUNICATION FUNCTIONS

BACKGROUND OF THE INVENTION

1. Field of the Invention

The present invention relates generally to a radio communication apparatus such as a potable telephone or the like, and more particularly to a radio communication apparatus in which communication functions such as an incoming call sound, an incoming call ringing pattern, an incoming call vibration, a received voice volume, a microphone sensibility, a noise canceling, a key confirming sound and a message recording are simultaneously set to a plurality of operation conditions suitable for a user's environment.

2. Description of the Related Art

2.1. Previously Proposed Art

A type of telephone such as a portable telephone and a personal handy phone which can be carried by a user has been recently developed. However, because a user receives a call even though the user stays in a public place, there is a social problem that the call troubles people placed near to the user. To solve this problem, a portable telephone in which a user does not receive any sound of an incoming call but a vibrator informs a user of an incoming call has been developed as a radio communication apparatus.

In a conventional portable telephone representing a conventional radio communication apparatus, because the vibration of a vibrator informs a user of an incoming call, it is required that a user sets the radio communication apparatus to a vibrator mode by operating a button and the user operates the radio communication apparatus to mute a sound of an incoming call. Also, in another conventional portable telephone, a user can set to a vibrator mode and a mute mode by operating a button.

2.2. Problems to be Solved by the Invention

However, because there are many environments in public places, the operation in the conventional radio communication apparatus is inconvenient even though the vibrator mode and the mute mode can be simultaneously set by operating a button. For example, in cases where a user is in an electric train as a type of public space, it is required that a volume of a received voice is turned up to listen to a caller's voice because the user is in a noisy place, a microphone sensibility is heightened to speak in a low voice, a noise canceler is set to an operation condition to reduce a surrounding noise mixing with a user's voice, and a key confirming sound informing the user of the pushing of a key is turned off. In contrast, in cases where a user is in a library or in a meeting room, it is not required to turn up a volume of a received voice because it is quiet in the library or the meeting room, and it is not required to set a noise canceler to an operation condition. Therefore, though a plurality of operation conditions required for a user's environment represented by an electric train differs from those required for another user's environment such as a library or a meeting room, there is a problem that a plurality of operation conditions cannot be simultaneously changed at an easy handling according to a user's environment.

SUMMARY OF THE INVENTION

An object of the present invention is to provide, with due consideration to the drawbacks of such a conventional radio communication apparatus, a radio communication apparatus in which a plurality of operation conditions of communication functions are simultaneously changed at an easy handling according to a user's environment.

The object of the present invention can be achieved by the provision of a radio communication apparatus, comprising:

operation condition storing means for storing a plurality of operation conditions of communication functions corresponding to each of a plurality of operation modes which each are suitable for an environment;

mode selecting means for selecting a particular operation mode suitable for a particular environment from the operation modes according to a user's intention;

radio communication signal receiving means for receiving a radio communication signal from a caller;

radio communication performing means, having the communication functions, for performing a radio communication between the user and the caller according to the radio communication signal received by the radio communication signal receiving means; and mode change control means for reading out a plurality of particular operation conditions of the communication functions corresponding to the particular operation mode selected by the mode selecting means from the operation condition storing means and setting the communication functions of the radio communication performing means to the particular operation conditions to perform the radio communication at the particular operation conditions.

In the above configuration, when a user inputs a mode selection request indicating the selection of a particular operation mode suitable for a particular environment, the particular operation mode is selected by the mode selecting means, a plurality of particular operation conditions of the communication functions corresponding to the particular operation mode are read out from the mode change control means, and the communication functions of the radio communication performing means are set to the particular operation conditions.

Thereafter, when a radio communication signal transmitted from a caller is received by the radio communication signal receiving means, a radio communication between the user and the caller is performed according to the radio communication signal by the radio communication performing means in which the communication functions are set to the particular operation conditions.

Accordingly, a plurality of operation conditions of communication functions corresponding to a particular operation mode suitable for a user's environment can be simultaneously changed at an easy handling.

BRIEF DESCRIPTION OF THE DRAWINGS

The objects, features and advantages of the present invention will be apparent from the following description taken in conjunction with the accompanying drawings, in which:

FIG. 1 is a block diagram of a radio communication apparatus according to a first embodiment of the present invention;

FIG. 2 shows a plurality of operation conditions stored in an operation condition setting memory and other memories for each of a plurality of operation modes such as an electric train mode, a car mode, a home mode, an amusement center mode, a library mode and a user mode;

DETAILED DESCRIPTION OF THE EMBODIMENTS

Figure 3:
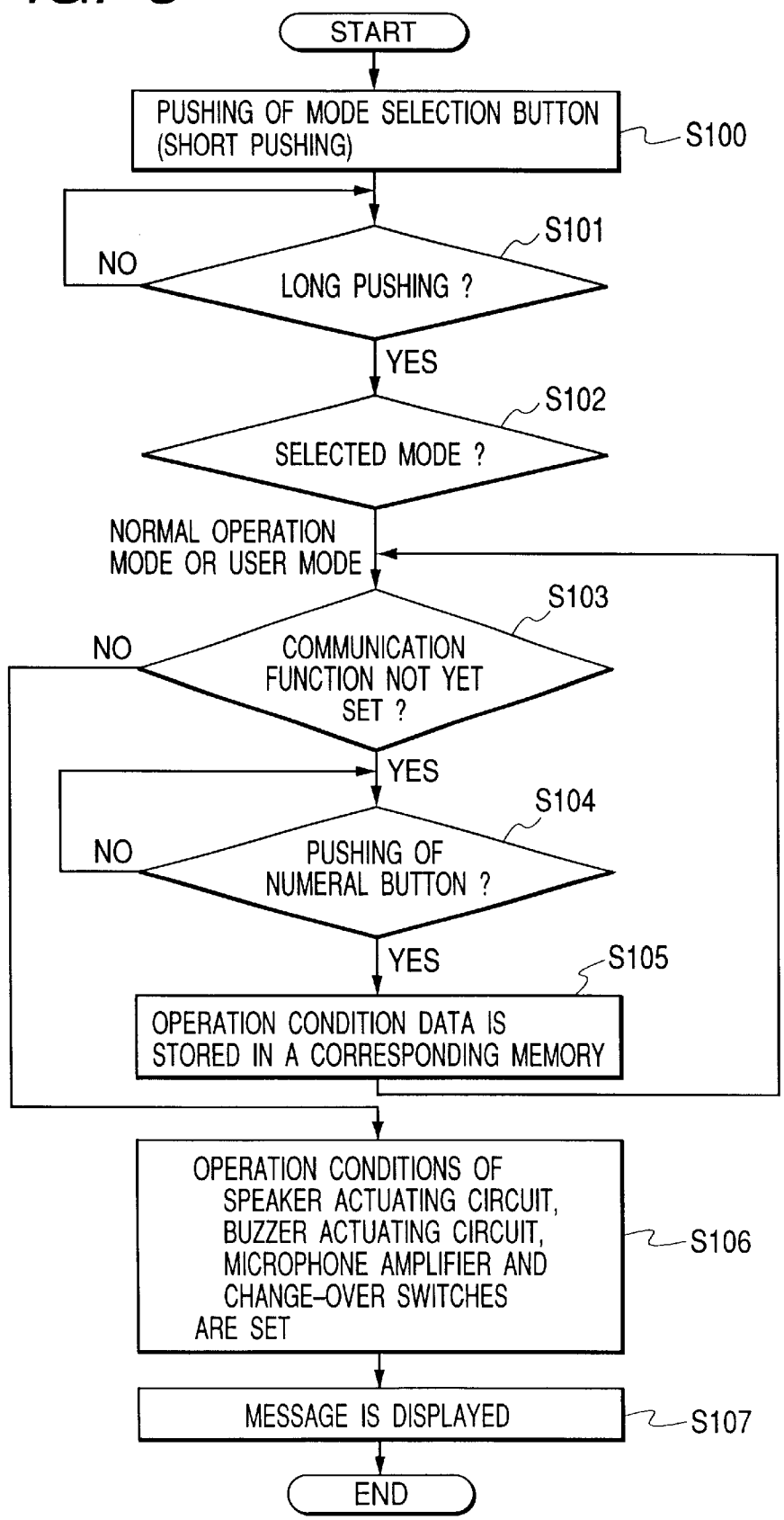
FIG. 3 is a flow chart showing the setting of a plurality of operation conditions performed under the control of a mode change control unit shown in FIG. 1 for a normal operation mode or a user mode.

Preferred embodiments of a radio communication apparatus according to the present invention are described with reference to the drawings.

FIG. 1 is a block diagram of a radio communication apparatus according to a first embodiment of the present invention.

As shown in FIG. 1, a radio communication apparatus 10 comprises:

an antenna 11 for receiving an input signal of an incoming call and an input signal of a caller's voice which are radiated as a radio wave transmitted from a public base station (not shown), and transmitting an output signal of a user's voice;

a radio wave processing unit 12 for detecting a phase of the input signals, amplifying the input signals to obtain the incoming call and the caller's call, and processing the user's voice to the output signal;

an operation condition storing unit 14 for storing a plurality of operation conditions of communication functions corresponding to each of a plurality of operation modes such as an electric train mode, a car mode, a home mode, an amusement center mode, a library mode and a user mode suitable for various environments, the communication functions being composed of an incoming call sound volume, an incoming call ringing pattern, an incoming call vibration, a received voice volume, a microphone sensibility, a noise canceling, a key confirming sound volume and a message recording for each operation mode;

a mode selection button 23 for receiving a mode selecting request indicating the selection of a particular operation mode from the user;

a communication function selecting unit 37, composed of seven communication function selection buttons corresponding to the communication functions in the normal operation mode or the user mode, for receiving a communication function selecting request indicating the selection of a particular communication function from the user to change an operation condition of the particular communication function in the normal operation mode or the user mode;

a numeral receiving unit 38, composed of ten numeral buttons indicating the numerals from "0" to "9", for respectively receiving a numeral as operation condition data in cases where the mode selection button 23 or one communication function selection button of the communication function selecting unit 37 is pushed by the user, and receiving a telephone number to call someone;

an incoming call sound volume memory 15 for storing operation conditions of the incoming call sound volume and the incoming call ringing pattern corresponding to a normal operation mode, the operation condition of the sound volume and ringing pattern being set by a user;

an incoming call vibrator on/off memory 16 for storing an operation condition of an incoming call vibration corresponding to the normal operation mode, the operation condition of the incoming call vibration being set by the user;

a received voice volume memory 17 for storing an operation condition of the caller's voice volume corresponding to the normal operation mode, the operation condition of the received voice volume being set by the user;

a microphone sensibility memory 18 for storing an operation condition of a microphone sensibility corresponding to the normal operation mode, the operation condition of the microphone sensibility being set by the user;

a noise canceler on/off memory 19 for storing an operation condition of the noise canceling corresponding to the normal operation mode, the operation condition of the noise canceling being set by the user;

a key confirming sound volume memory 20 for storing an operation condition of the key confirming sound volume corresponding to the normal operation mode, the operation condition of the key confirming sound volume being set by the user;

a message recording on/off memory 21 for storing an operation condition of the message recording corresponding to the normal operation mode, the operation condition of the message recording being set by the user;

an incoming call vibrator 31 vibrating to inform the incoming call of the user;

a vibrator actuating circuit 25 for actuating the incoming call vibrator 31 to vibrate the vibrator 31;

a first change-over switch 24 for changing over the operation of the incoming call vibrator 31 from the vibration (or no vibration) to the no vibration (or vibration) according to one operation condition of the incoming call vibration;

an incoming call buzzer 32 ringing at one incoming call pattern to inform the incoming call of the user;

a buzzer actuating circuit 26 for actuating the incoming call buzzer 32 according to operation conditions of the incoming call sound volume and the incoming call ringing pattern to ring the buzzer 32 at a sound volume and one ringing pattern;

a speaker 33 for outputting a key confirming sound to make the user confirm the pushing of the mode selection button 23, one numeral button of the numeral receiving unit 38 or one communication function selection button of the communication function selecting unit 37, and outputting the received voice of the caller;

a speaker actuating circuit 27 for actuating the speaker 33 according to operation conditions of the received voice volume and the key confirming sound volume to adjust a sound volume of the key confirming sound output from the speaker 33 and a sound volume of the received voice output from the speaker 33;

a microphone 34 for receiving the user's voice;

a microphone amplifier 28 for amplifying the user's voice received by the microphone 34 at a microphone sensibility according to one operation condition of the microphone sensibility, the amplified user's voice being transmitted to the caller through the radio wave processing unit 12 and the antenna 11 to reproduce the user's voice at a top sound volume in cases where the user's voice is amplified at a high microphone sensibility and to reproduce the user's voice at a low sound volume in cases where the user's voice is amplified at a low microphone sensibility;

a noise canceler 29 for reducing a noise mixing with the user's voice amplified by the microphone amplifier 28;

a pair of second change-over switches 30 for changing over from the reduction of the noise (or no-reduction) to the no-reduction (reduction of the noise) according to one operation condition of the noise canceling;

a message recording unit 35 for recording a message of a caller;

a third change-over switch 36 for changing over from the recording of a caller's message (or no recording) to no recording (or recording of a caller's message) according to one operation condition of the message recording;

a mode change control unit 13 for controlling a mode change according to the mode selecting request of the user received by the mode selection button 23 by reading out the plurality of operation conditions of the communication functions of the normal operation mode stored in the memories 15 to 21 in cases where the mode selecting request indicates the normal operation mode, reading out a plurality of operation conditions of the communication functions of the particular operation mode from the operation condition storing unit 14 in cases where the particular operation mode indicated by the mode selecting request is not the normal operation mode, controlling the buzzer actuating circuit 26, the first change-over switch 24, the speaker actuating circuit 27, the microphone amplifier 28, the pair of second change-over switches 30 and the third change-over switch 36 according to the plurality of operation conditions of the communication functions in the particular operation mode (or the normal operation mode), changing the operation condition set in the buzzer actuating circuit 26, the first change-over switch 24, the speaker actuating circuit 27, the microphone amplifier 28, the pair of second change-over switches 30 or the third change-over switch 36 according to the communication function selecting request received by the communication function selecting unit 37 and a numeral input to one numeral button of the numeral receiving unit 38, and renewing the operation condition data stored in one memory 15, 16, 17, 18, 19, 20 or 21 corresponding to the particular communication function indicated by the communication function selecting unit 37; and a displaying unit 22 for displaying a name of a mode selected by the user under the control of the mode change control unit 13 when the user pushes the mode selection button 23.

A normal operation mode storing unit is composed of the incoming call sound volume memory 15, the incoming call vibrator on/off memory 16, the received voice volume memory 17, the microphone sensibility memory 18, the noise canceler on/off memory 19, the key confirming sound volume memory 20 and the message recording on/off memory 21. A radio communication performing unit is composed of the incoming call vibrator 31, the vibrator actuating circuit 25, the first change-over switch 24, the incoming call buzzer 32, the buzzer actuating circuit 26, the speaker 33, the speaker actuating circuit 27, the microphone 34, the microphone amplifier 28, the noise canceler 29, the second change-over switches 30, the message recording unit 35 and the third change-over switch 36.

FIG. 2 shows a sound volume and ringing pattern of an incoming call, an operation condition of an incoming call vibrator, a voice volume of the caller's voice, a sensibility of a microphone, an operation condition of a noise canceler, a sound volume of a key confirming sound and an operation condition of a message recorder stored in the operation condition storing unit 14 and the memories 15 to 21 for each of a plurality of operation modes such as an electric train mode, a car mode, a home mode, an amusement center mode, a library mode and a user mode. The operation conditions of the communication functions for the electric train mode, a car mode, a home mode, an amusement center mode and a library mode are set in advance in the operation condition storing unit 14. The operation conditions of the communication functions for the user mode are arbitrarily set by the user and are stored in the operation condition storing unit 14. The operation conditions of the communication functions for the normal operation condition are arbitrarily set by the user and are stored in the memories 15 to 21.

The electric train mode is suitable for a user going by train, the car mode is suitable for a user going by car, the home mode is suitable for a user staying in his own house, the amusement center mode is suitable for a user staying in a noisy place such as an amusement place, and the library mode is suitable for a user staying in a quiet place represented by a library.

In the above configuration, an operation of the radio communication apparatus 10 is described.

The setting of a plurality of operation conditions of the communication functions for the normal operation mode is initially described with reference to FIG. 3.

FIG. 3 is a flow chart showing the setting of a plurality of operation conditions of the communication functions performed by the user under the control of the mode change control unit 13 for the normal operation mode or the user mode.

When the user pushes the mode selection button 23 for a short time (for example, a prescribed time shorter than 1 second) in a step S100, a message indicating a current mode is initially displayed on the displaying unit 22. In cases where the pushing of the mode selection button 23 is the first time, because the normal operation mode is originally set as the current mode, a message "normal operation mode" is displayed. A message displayed on the displaying unit 22 is cyclically changed to another in the order of "normal operation mode", "electric train mode", "car mode", "home mode", "amusement center mode", "library mode", "user mode", "normal operation mode", "electric train mode",— under the control of the mode change control unit 13 each time the user pushes the mode selection button 23 for a short time. Thereafter, when a message of a particular operation mode desired by the user is displayed on the displaying unit 22, the user pushes the mode selection button 23 for a long time (for example, a prescribed time longer than 1 second). Therefore, the particular operation mode is selected by the user in a step S101.

Thereafter, it is judged by the mode change control unit 13 in a step S102 what mode the user selects. In cases where the particular operation mode is the normal operation mode, it is judged in a step S103 by the mode change control unit 13 whether or not one communication function not yet set by the user exists. In cases where one communication function not yet set by the user exists, a message corresponding to one communication function not yet set by the user is displayed on the displaying unit 22. For example, a first message "sound volume of incoming call, mute=0, low=1, ordinary= 2, top=3" corresponding to an incoming call sound volume, a second message "ringing pattern of incoming call, pattern 1=1, pattern 2=2" corresponding to a ringing pattern, a third message "incoming call vibrator, ON=1, OFF=2" corresponding to an incoming call vibration, a fourth message "voice volume, low=1, ordinary=2, top=3" corresponding to a received voice volume, a fifth message "microphone sensibility, low=1, ordinary=2, high=3" corresponding to a microphone sensibility, a sixth message "noise canceler, ON=1, OFF=2" corresponding to a noise canceler, a seventh message "key confirming sound, mute=0, low=1, ordinary=2, top=3" corresponding to a key confirming sound volume and an eighth message "message recorder, ON=1, OFF=2" corresponding to a message recording are displayed in that order under the control of the mode change control unit 13 on condition that the communication function corresponding the message is not yet set by the user. Thereafter, for example, in cases where the user pushes the numeral button of "0" (or "1", "2", or "3") in the numeral receiving unit 38 in a step S104 when the first message is displayed, the sound volume of incoming call is set to a mute condition (or a low volume, an ordinary volume or a top volume) for the normal operation mode in a step S105. That is, the setting of the mute condition is stored in the incoming call sound volume memory 15 as data of the incoming call sound volume. Also, in cases where the user selects a ringing pattern of the incoming call by pushing one numeral button of the numeral receiving unit 38 when the second message is displayed, the setting of the ringing pattern is stored in the incoming call sound volume memory 15 as data of the ringing pattern. Also, in cases where the user selects an operation condition of the incoming call vibrator 31 by pushing one numeral button of the numeral receiving unit 38 when the third message is displayed, the setting of the operation condition in the incoming call vibrator 31 is stored in the incoming call vibrator on/off memory 16 as data of the operation condition of the incoming call vibrator 31. Also, in cases where the user selects a voice volume of the caller's voice by pushing one numeral button of the numeral receiving unit 38 when the fourth message is displayed, the setting of the operation condition of the voice volume is stored in the received voice volume memory 17 as data of the operation condition of the caller's voice. Also, in cases where the user selects a microphone sensibility by pushing one numeral button of the numeral receiving unit 38 when the fifth message is displayed, the setting of the microphone sensibility is stored in the microphone sensibility memory 18 as data of the operation condition. Also, in cases where the user selects an operation condition of the noise canceler 29 by pushing one numeral button of the numeral receiving unit 38 when the sixth message is displayed, the setting of the operation condition of the noise canceler 29 is stored in the noise canceler on/off memory 19 as data of the operation condition of the noise canceler 29. Also, in cases where the user selects an operation condition of the key confirming sound by pushing one numeral button of the numeral receiving unit 38 when the seventh message is displayed, the setting of the operation condition of the key confirming sound is stored in the key confirming sound volume memory 20 as data of the operation condition of the key confirming sound. Also, in cases where the user selects an operation condition of the message recording unit 35 by pushing one numeral button of the numeral receiving unit 38 when the eighth message is displayed, the setting of the operation condition of the message recording unit 35 is stored in the message recording on/off memory 21 as data of the operation condition of the message recording unit 35. The steps S103 to S105 are repeated until all operation conditions for the normal operation mode are set by the user.

After all operation conditions are set, in a step S106, an operation condition of the first change-over switch 24 is set according to the data stored in the incoming call vibrator on/off memory 16, an operation condition of the speaker actuating circuit 27 is set according to the data stored in the received voice volume memory 17 and the key confirming sound volume memory 20, an operation condition of the buzzer actuating circuit 26 is set according to the data stored in the incoming call sound volume memory 15, an operation condition of the second change-over switches 30 is set according to the data stored in the noise canceler on/off memory 19, an operation condition of the microphone amplifier 28 is set according to the data stored in the microphone sensibility memory 18, and an operation condition of the third change-over switch 36 is set according to the data stored in the message recording on/off memory 21.

Thereafter, in a step S107, a message "setting of normal operation mode is completed" is displayed for a prescribed time on the displaying unit 22.

Next, the setting of a plurality of operation conditions of communication functions for the user mode is described.

As shown in FIG. 3, in cases where it is judged by the mode change control unit 13 in the step S102 that the particular operation mode selected by the user in the step S101 is the user mode, the steps S103 to S105 are performed to set a plurality of operation conditions of communication functions for the user mode. The operation conditions set by the user in the step S104 are stored as operation condition data of the user mode in the operation condition storing unit 14 in the step S105. Thereafter, the communication functions of the first change-over switch 24, the speaker actuating circuit 27, the buzzer actuating circuit 26, the second change-over switches 30, the microphone amplifier 28 and the third change-over switch 36 are simultaneously set to the operation conditions which are indicated by the operation condition data of the user mode stored in the operation condition storing unit 14 under the control of the mode change control unit 13 in the step S106.

Thereafter, in the step S107, a message "setting of user mode is completed" is displayed for a prescribed time on the displaying unit 22.

Next, the selection of one mode, of which the operation conditions are stored in the operation condition storing unit 14, is described with reference to FIG. 4.

Figure 4:
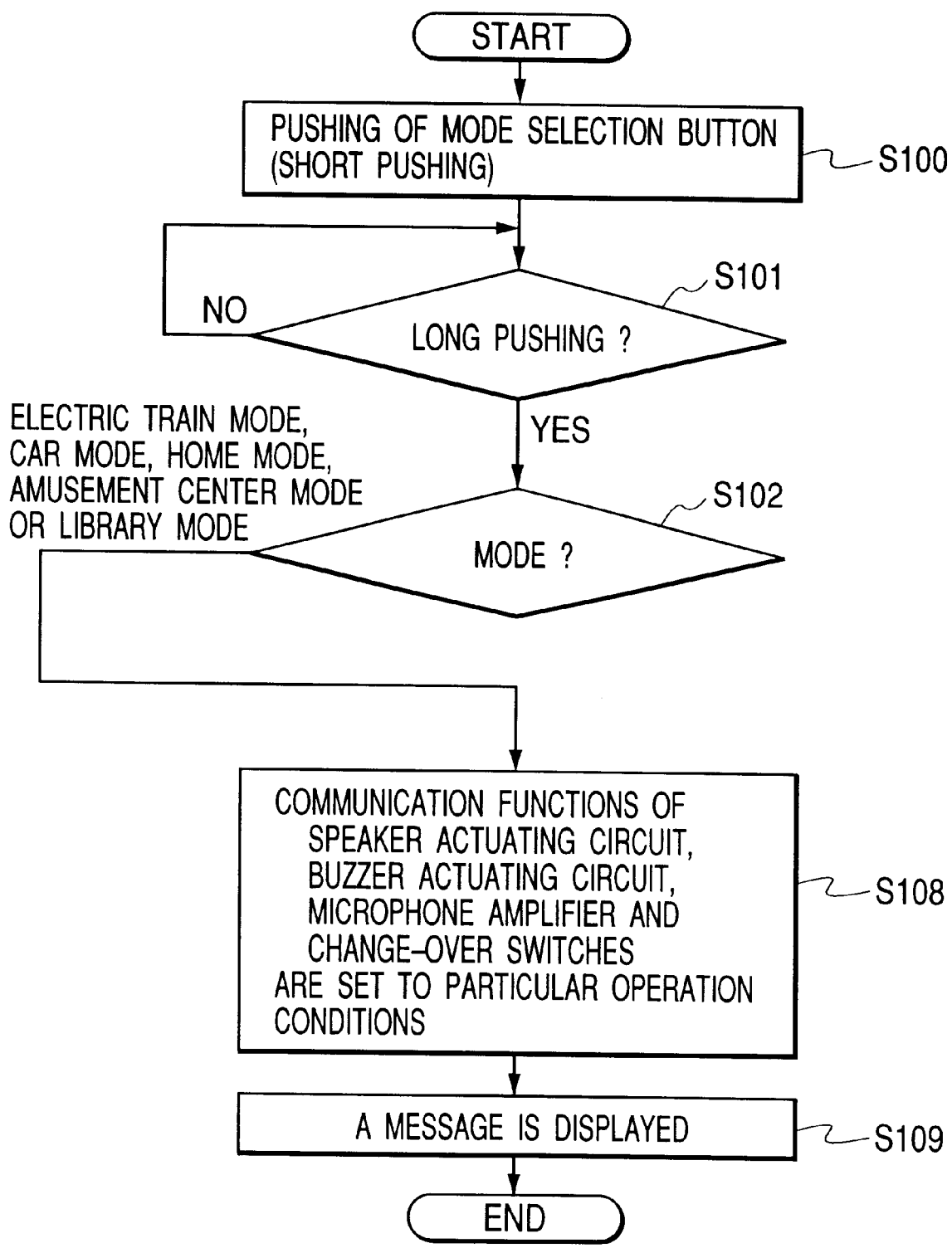
FIG. 4 is a flow chart showing the setting of a plurality of operation conditions performed under the control of the mode change control unit for an electric train mode, a car mode, a home mode, an amusement center mode or a library mode.

FIG. 4 is a flow chart showing the setting of the operation conditions of the first change-over switch 24, the speaker actuating circuit 27, the buzzer actuating circuit 26, the second change-over switches 30, the microphone amplifier 28 and the third change-over switch 36 in the electric train mode, the car mode, the home mode, the amusement center mode or the library mode.

As shown in FIG. 4, in cases where it is judged by the mode change control unit 13 in the step S102 that the particular operation mode selected by the user in the step S101 is the electric train mode, the car mode, the home mode, the amusement center mode or the library mode, particular operation conditions corresponding to the particular operation mode are read out from the operation condition storing unit 14 by the mode change control unit 13, and the communication functions of the first change-over switch 24, the speaker actuating circuit 27, the buzzer actuating circuit 26, the second change-over switches 30, the microphone amplifier 28 and the third change-over switch 36 are simultaneously set to the particular operation conditions under the control of the mode change control unit 13 in a step S108.

For example, in cases where the electric train mode is selected by the user, because pieces of operation condition data indicating the sound volume of incoming call set to a mute condition, the incoming call vibrator 31 set to an "ON" condition, a voice volume of the caller's voice set to a top level, a microphone sensibility set to a "high" condition, the noise canceler 29 set to an "ON" condition, the key confirming sound set to a mute condition and the message recording unit 35 set to an "OFF" condition are stored in the operation condition storing unit 14, the buzzer actuating circuit 26 is set to an "OFF" condition not to ring the buzzer 32, the first change-over switch 24 is turned on to vibrate the incoming call vibrator 31, a voice amplification in the speaker actuating circuit 27 is set to a top level to maximize a sound level of the caller's voice, a voice amplification in the microphone amplifier 28 is set to a top level to maximize a sound level of the user's voice, the operation condition of the second change-over switches 30 is set to reduce a noise in the noise canceler 29, the speaker actuating circuit 27 is set not to output any key confirming sound from the speaker 33, and the third change-over switch 36 is turned off not to record any caller's message.

Thereafter, in a step S109, a message indicating the setting of the communication functions corresponding to the particular operation mode is displayed on the displaying unit 22. For example, a message "setting of electric train mode is completed" is displayed for a prescribed time on the displaying unit 22 in cases where the electric train mode is selected by the user.

After the procedure shown in FIG. 3 or FIG. 4 is completed, the radio communication apparatus 10 is set in an incoming call receiving condition.

Therefore, when a signal of an incoming call and a signal of a caller's voice are received by the antenna 11 on condition that the radio communication apparatus 10 is, for example, set in the electric train mode, the signals are processed in the radio wave processing unit 12 to obtain the incoming call and the caller's voice. Thereafter, the ringing of the incoming call is not performed, the user is informed of the incoming call by the vibration of the incoming call vibrator 31. Thereafter, the user receives the caller's voice reproduced at a top level by the speaker 33, and the user talks with the caller. In this case, a user's voice is received by the microphone 34 as a user's voice signal, and the user's voice signal is amplified at a top level by the microphone amplifier 28. Thereafter, because the operation condition of the second change-over switches 30 is set to a turn-off condition, the noise canceler 29 is used to reduce a noise mixing with the user's voice in the noise canceler 29. Also, because the third change-over switch 36 is set to a turn-off condition, even though the user is absent, the caller's voice is not recorded in the message recording unit 35.

Next, the change of one operation condition of one communication function is described with reference to FIG. 5.

Figure 5:
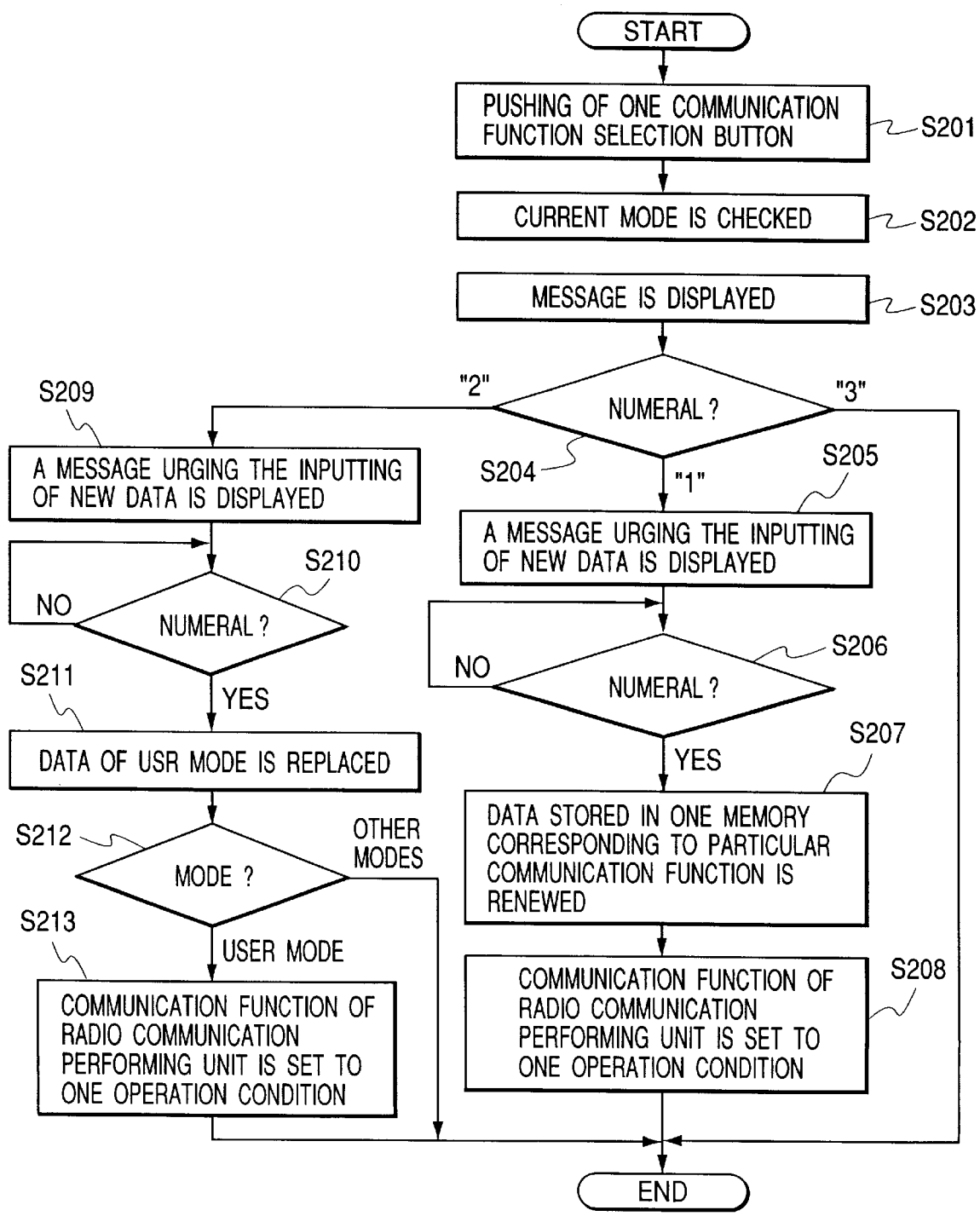
FIG. 5 is a flow chart showing the change of one operation condition performed under the control of the mode change control unit.

FIG. 5 is a flow chart showing the change of one operation condition.

As shown in FIG. 5, when the user pushes one communication function selection button corresponding to a particular communication function in the communication function selecting unit 37 in a step S201, a current mode set in the radio communication apparatus 10 is checked by the mode change control unit 13 in a step S202. In cases where the normal operation mode is set, a message "Do you change a communication function of the normal operation mode? YES=1, No=3, change in user mode=2" is displayed on the displaying unit 22 in a step S203. Also, in cases where the electric train mode (or the car mode, the home mode, the amusement center mode, the library mode or the user mode) is set in the radio communication apparatus 10, a message "Do you change a communication function of the electric train mode (or the car mode, the home mode, the amusement center mode, the library mode or the user mode)? YES=1, No=3, change in user mode=2" is displayed. Therefore, the user can know the mode currently set in the radio communication apparatus 10. Thereafter, it is judged in a step S204 by the mode change control unit 13 which numeral button of the numeral receiving unit 38 the user pushes. In cases where the user pushes the numeral button of "3" in reply to the message, this operation condition changing procedure is finished. In contrast, in cases where the user pushes the numeral button of "1" in reply to the message, a message urging the inputting of new data of the particular operation condition is displayed on the displaying unit 22 in a step S205. For example, a first message "please input an incoming call sound volume and a ringing pattern, mute=0, low and ringing pattern 1=1, ordinary and ringing pattern 1=2, top and ringing pattern 1=3, low and ringing pattern 2=4, ordinary and ringing pattern 2=5, top and ringing pattern 2=6", is displayed in cases where the particular communication function is an incoming call sound volume and a ringing pattern, a second message "please input an incoming call vibration ON=1, OFF=2" is displayed in cases where the particular communication function is an incoming call vibration, a third message "please input a voice volume, low=1, ordinary=2, top=3" is displayed in cases where the particular communication function is a received voice sound volume, a fourth message "please input a microphone sensibility, low=1, ordinary=2, high=3" is displayed in cases where the particular communication function is a microphone sensibility, a fifth message "please input a noise canceling, ON=1, OFF=2" is displayed in cases where the particular communication function is a noise canceling, a sixth message "please input a key confirming sound volume, mute=0, low=1, ordinary=2, top=3" is displayed in cases where the particular communication function is a key confirming sound volume, and a seventh message "please input a message recording, ON=1, OFF=2" is displayed in cases where the particular communication function is a message recording.

Thereafter, it is judged in a step S206 by the mode change control unit 13 which numeral button of the numeral receiving unit 38 the user pushes. In cases where the user pushes a particular numeral button in reply to the message, operation condition data stored in one memory 15, 16, 17, 18, 19, 20 or 21 corresponding to the particular communication function is replaced with new operation condition data indicated by the pushing of the particular numeral button of the numeral receiving unit 38 in a step S207, and the communication function of the speaker actuating circuit 27, the buzzer actuating circuit 26, the microphone amplifier 28, the first change-over switch 24, the second change-over switches 30 or the third change-over switch 36 corresponding to the particular communication function is changed to an operation condition indicated by the new operation condition data in a step S208. For example, in cases where the user pushes the numeral button of "1" in reply to the first message, data stored in the incoming call sound volume memory 15 is replaced with new operation condition data indicating a low sound volume and a ringing pattern 1 for an incoming call, and the communication function of the buzzer actuating circuit 26 is set to ring an incoming call at a low sound volume. Also, in cases where the user pushes the numeral button of "1" in reply to the second message, data stored in the incoming call vibrator on/off memory 16 is replaced with new operation condition data indicating the incoming call vibration, and the first change-over switch 24 is turned on. Also, in cases where the user pushes the numeral button of "1" in reply to the third message, data stored in the received voice sound volume memory 17 is replaced with new operation condition data indicating a low sound volume, and the communication function of the speaker actuating circuit 27 is set to reproduce the received voice at a low sound volume. Also, in cases where the user pushes the numeral button of "1" in reply to the fourth message, data stored in the microphone sensibility memory 18 is replaced with new operation condition data indicating a low microphone sensibility, and the communication function of the microphone amplifier 28 is set to a low microphone sensibility. Also, in cases where the user pushes the numeral button of "1" in reply to the fifth message, data stored in the noise canceler on/off memory 19 is replaced with new operation condition data indicating a noise canceling, and the communication function of the second change-over switches 30 is set not to operate the noise canceler 29. Also, in cases where the user pushes the numeral button of "1" in reply to the sixth message, data stored in the key confirming sound volume memory 20 is replaced with new operation condition data indicating a low sound volume, and the communication function of the speaker actuating circuit 27 is set to reproduce a key confirming sound at a low sound volume. Also, in cases where the user pushes the numeral button of "1" in reply to the seventh message, data stored in the message recording on/off memory 21 is replaced with new operation condition data indicating the message recording, and the third change-over switch 36 is turned on.

Accordingly, even though the radio communication apparatus 10 is set to any mode, a particular communication function is immediately designated by the user, and an operation condition of the particular communication function can be immediately changed at a easy handling. Also, because the data of one corresponding memory selected from the memories 15 to 21 is renewed, the particular communication function of the radio communication apparatus 10 can be operated at user's desired operation condition even though the mode in the radio communication apparatus 10 is changed to the normal operation mode.

Next, the change of one operation condition of one communication function of the user mode is described with reference to FIG. 5.

In cases where the user pushes the numeral button of "2" in reply to the message in the step S204, a message urging the inputting of new operation condition data of the particular communication function is displayed on the displaying unit 22 in a step S209 in the same manner as in the step S205. Thereafter, it is judged in a step S210 by the mode change control unit 13 which numeral button of the numeral receiving unit 38 the user pushes. In cases where the user pushes a particular numeral button in reply to the message, data of the user mode corresponding to the particular communication function in the operation condition storing unit 14 is replaced with new operation condition data indicated by the pushing of the particular numeral button in a step S211. Thereafter, it is judged in a step S212 by the mode change control unit 13 at what mode the radio communication apparatus 10 is set. In cases where the user mode is set, the communication function of the speaker actuating circuit 27, the buzzer actuating circuit 26, the microphone amplifier 28, the first change-over switch 24, the second change-over switches 30 or the third change-over switch 36 corresponding to the particular communication function is changed to an operation condition indicated by the new operation condition data in a step S213.

Accordingly, even though the radio communication apparatus 10 is set to any mode, a particular communication function in the user mode is designated by the user, and an operation condition of the particular communication function can be immediately changed at a easy handling.

Next a second embodiment is described with reference to FIGS. 6 and 7.

Figure 6:
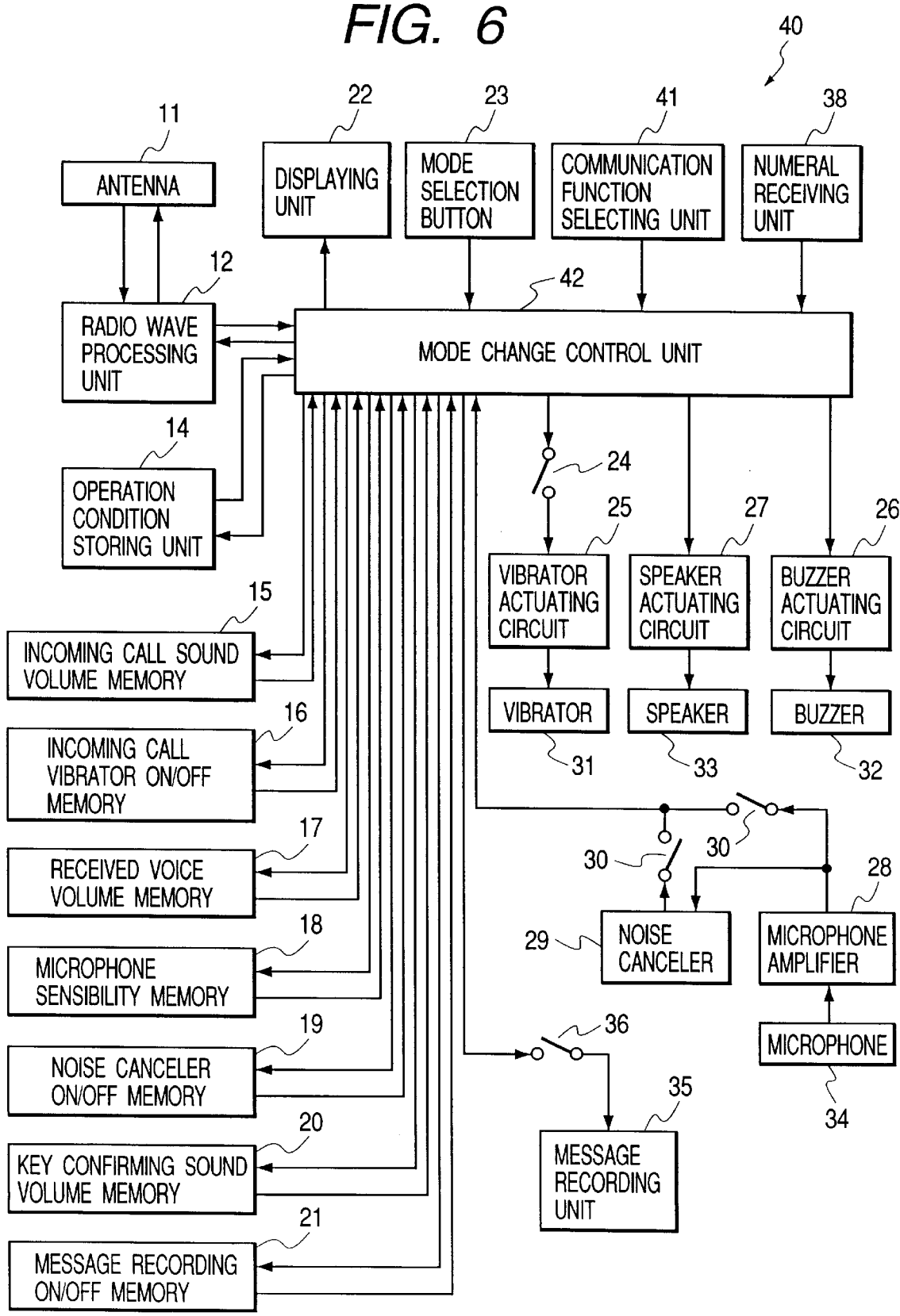
FIG. 6 is a block diagram of a radio communication apparatus according to a second embodiment of the present invention.

FIG. 6 is a block diagram of a radio communication apparatus according to a second embodiment of the present invention.

As shown in FIG. 6, a radio communication apparatus 40 comprises the antenna 11, the radio wave processing unit 12, the operation condition storing unit 14, the incoming call sound volume memory 15, the incoming call vibrator on/off memory 16, the received voice volume memory 17, the microphone sensibility memory 18, the noise canceler on/off memory 19, the key confirming sound volume memory 20, the message recording on/off memory 21, the mode selection button 23, the incoming call vibrator 31, the vibrator actuating circuit 25, the first change-over switch 24, the incoming call buzzer 32, the buzzer actuating circuit 26, the speaker 33, the speaker actuating circuit 27, the microphone 34, the microphone amplifier 28, the noise canceler 29, the second change-over switches 30, the message recording unit 35, the third change-over switch 36, a communication function selecting unit 41, composed of seven communication function selection buttons corresponding to the plurality of communication functions of one mode currently set, for respectively receiving a communication function selecting request indicating the selection of a particular communication function from the user to change an operation condition of the particular communication function of the current mode, the ten numeral receiving unit 38, a mode change control unit 42 for controlling a mode change according to the mode selecting request of the user received by the mode selection button 23 by reading out the plurality of operation conditions of communication functions of the normal operation mode stored in the memories 15 to 21 in cases where the mode selecting request indicates the normal operation mode, reading out a plurality of operation conditions of communication functions of the particular operation mode from the operation condition storing unit 14 in cases where the particular operation mode indicated by the mode selecting request is not the normal operation mode, controlling the buzzer actuating circuit 26, the first change-over switch 24, the speaker actuating circuit 27, the microphone amplifier 28, the second change-over switches 30 and the third change-over switch 36 according to the plurality of operation conditions of the particular operation mode (or the normal operation mode) and changing the operation condition in the buzzer actuating circuit 26, the first change-over switch 24, the speaker actuating circuit 27, the microphone amplifier 28, the second change-over switches 30 or the third change-over switch 36 according to the communication function selecting request received by one communication function selection button of the communication function selecting unit 41 and a numeral input to one numeral button of the numeral receiving unit 38, and the displaying unit 22.

In the above configuration, the change of one operation condition of one communication function in the radio communication apparatus 40 differs from that in the radio communication apparatus 10.

Figure 7:
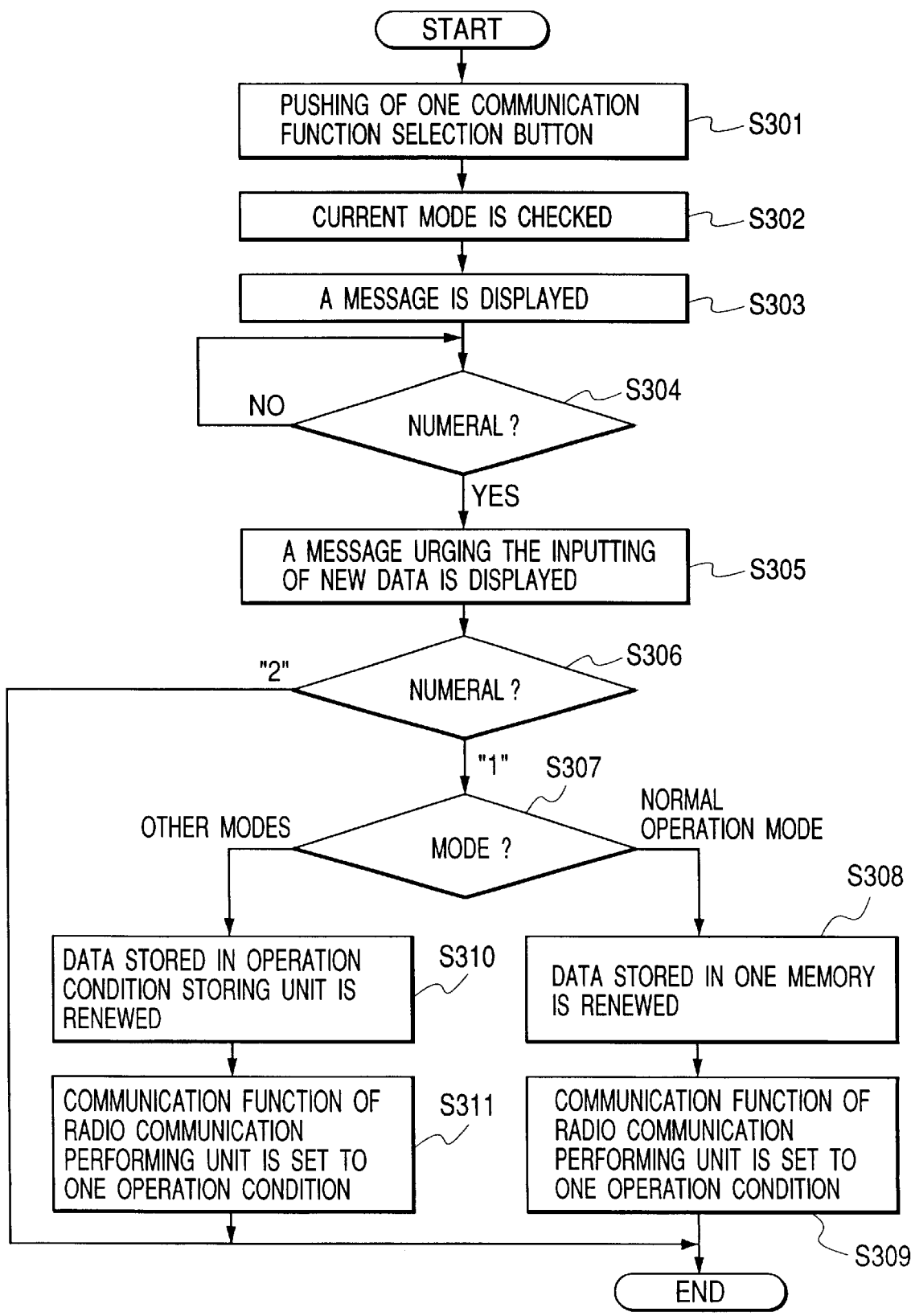
FIG. 7 is a flow chart showing the change of one operation condition performed under the control of a mode change control unit shown in FIG. 6.

FIG. 7 is a flow chart showing the change of one operation condition according to a second embodiment.

As shown in FIG. 7, when the user pushes one communication function selection button corresponding to a particular communication function in the communication function selecting unit 41 in a step S301, a current mode set in the radio communication apparatus 40 is checked by the mode change control unit 42 in a step S302, and a message according to the current mode is displayed on the displaying unit 22 in a step S303. For example, in cases where the normal operation mode is set, a message "Do you change an operation condition of a communication function of the normal operation mode? YES=1, No=2" is displayed on the displaying unit 22. Also, in cases where the electric train mode (or the car mode, the home mode, the amusement center mode, the library mode or the user mode) is set in the radio communication apparatus 40, a message "Do you change an operation condition of a communication function of the electric train mode (or the car mode, the home mode, the amusement center mode, the library mode or the user mode)? YES=1, No=2" is displayed. Therefore, the user can know the mode currently set in the radio communication apparatus 40. Thereafter, it is judged in a step S304 by the mode change control unit 13 which numeral button of the numeral receiving unit 38 the user pushes. In cases where the user pushes the numeral button of "2" in reply to the message, this operation condition changing procedure is finished. In contrast, in cases where the user pushes the numeral button of "1" in reply to the message, a message urging the inputting of new operation condition data of the particular communication function is displayed on the displaying unit 22 in a step S305 in the same manner as in the step S205 of FIG. 5.

Thereafter, it is judged in a step S306 by the mode change control unit 13 which numeral button of the numeral receiving unit 38 the user pushes. In cases where the user pushes a particular numeral button in reply to the message, it is judged in a step S307 by the mode change control unit 13 at what mode the radio communication apparatus 10 is set. In cases where the normal operation mode is set as a current mode, operation condition data stored in one memory 15, 16, 17, 18, 19, 20 or 21 corresponding to the particular communication function is replaced with new operation condition data indicated by the pushing of the particular numeral button in a step S308 in the same manner as in the step S207 of FIG. 5, and the communication function of the speaker actuating circuit 27, the buzzer actuating circuit 26, the microphone amplifier 28, the first change-over switch 24, the second change-over switches 30 or the third change-over switch 36 corresponding to the particular communication function is changed to an operation condition indicated by the new operation condition data in a step S309 in the same manner as in the step S208 of FIG. 5.

In contrast, in cases where a particular operation mode representing the electric train mode, car mode, the home mode, the amusement center mode, the library mode or the user mode is set as a current mode in the step S307, operation condition data of the particular operation mode stored in the operation condition storing unit 14 is replaced with new operation condition data indicated by the pushing of the particular numeral button in a step S310, and the communication function of the speaker actuating circuit 27, the buzzer actuating circuit 26, the microphone amplifier 28, the first change-over switch 24, the second change-over switches 30 or the third change-over switch 36 corresponding to the particular communication function is changed to an operation condition indicated by the new operation condition data in a step S311 in the same manner as in the step S208 of FIG. 5.

Accordingly, even though the radio communication apparatus 10 is set to any current mode, the setting of one operation condition of a particular communication function in the current mode can be immediately changed at a easy handling, and the particular communication function of the radio communication apparatus 40 can be immediately changed to user's desired condition at a easy handling.

In the second embodiment, operation condition data of the electric train mode, car mode, the home mode, the amusement center mode or the library mode stored in the operation condition storing unit 14 is renewed. However, it is applicable that operation condition data of the electric train mode, car mode, the home mode, the amusement center mode or the library mode stored in the operation condition storing unit 14 be not renewed even though the operation condition changing procedure is performed.

Also, in the first and second embodiments, the short-time button pushing in the step S100 is shorter than 1 second, and the long-time button pushing in the step S101 is longer than 1 second. However, it is applicable that the short-time button pushing in the step S100 be shorter than 0.5 second, and the long-time button pushing in the step S101 is longer than 1.5 second.

Also, in the first and second embodiments, the seven communication function selection buttons of the communication function selecting unit 37 (or 41) are used to specify a particular communication function. However, it is applicable that a single communication function selection button be used in place of the seven communication function selection buttons. In this case, the communication functions are cyclically displayed on the displaying unit 22 while changing the display of one communication function to another each time the single communication function selection button is pushed for a short time, and a particular communication function is specified under the control of the mode change control unit 13 (or 42) in cases where the single communication function selection button is pushed for a long time when the particular communication function is displayed.

Also, modes corresponding to user's environments are not limited to the modes stored in the mode change control unit 13 in the present invention.

Also, the user mode is not limited to a mode corresponding to user's environment. For example, it is applicable that the user mode correspond to user's circumstance such as user's physical condition.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A radio communication apparatus, comprising:
   storing means for storing a plurality of operation conditions of communication functions corresponding to each of a plurality of operation modes which each are suitable for an environment;
   said communication functions including an incoming call vibration function and a received voice volume function, said operation conditions of the incoming call vibration function including an on condition and an off condition, said operation conditions of the received voice volume function including a top condition and an ordinary condition, said on condition of the incoming call vibration function and said top condition of the received voice volume function being stored, as first operation conditions in the plurality of operation conditions, on the storing means so as to correspond to each other, said first operation conditions corresponding to a first operation mode;

mode selecting means for selecting the first operation mode suitable for a particular environment from the operation modes according to a user's intention;

mode change control means for reading out the first operation conditions corresponding to the first operation mode selected by the mode selecting means from the storing means to set the incoming call vibration function to the on condition of the first operation conditions corresponding to the first operation mode, and to set the received voice volume function to the top condition thereof corresponding to the first operation mode;

radio communication signal receiving means for receiving a radio communication signal from a caller;

an incoming call informing unit for vibrating a vibrator to inform the user of an incoming call reproduced from the radio communication signal received by the radio communication signal receiving means according to the incoming call vibration function set to the on condition by the mode change control means; and a received voice outputting unit for outputting a caller's voice reproduced from the radio communication signal at a top sound volume according to the received voice volume function set to the top condition by the mode change control means.

2. A radio communication apparatus according to claim 1, further comprising:

operation condition inputting means for inputting an operation condition of each communication function according to the user's intention to store a plurality of particular operation conditions of the communication functions, corresponding to a user mode other than the operation modes, in the operation condition storing means in cases where the user mode is selected by the mode selecting means, the particular operation conditions of the communication functions being read out from the operation condition storing means to set the communication functions of the radio communication performing means to the particular operation conditions under the control of the mode change control means.

3. A radio communication apparatus according to claim 1, further comprising:

operation condition inputting means for inputting an operation condition of each communication function according to the user's intention to store a plurality of particular operation conditions of the communication functions corresponding to a normal operation mode other than the operation modes in cases where the normal operation mode is selected by the mode selecting means; and normal operation mode storing means for storing the particular operation conditions of the communication functions corresponding to the normal operation mode input by the operation condition inputting means, the particular operation conditions of the communication functions being read out from the normal operation mode storing means to set the communication functions of the radio communication performing means to the particular operation conditions under the control of the mode change control means.

4. A radio communication apparatus according to claim 1, further comprising:

communication function selecting means for selecting a specific communication function from the operation modes in cases where a specific operation mode is selected by the mode selecting means; and operation condition inputting means for inputting a specific operation condition of the specific communication function selected by the communication function selecting means according to the user's intention to renew the particular operation condition of the specific communication function corresponding to the specific operation mode stored in the operation condition storing means to the specific operation condition under the control of the mode change control means, the specific communication function of the radio communication performing means being reset to the specific operation condition under the control of the mode change control means.

5. A radio communication apparatus according to claim 1, further comprising:

communication function selecting means for selecting a specific communication function from the operation modes in cases where a specific operation mode is selected by the mode selecting means; and operation condition inputting means for inputting a specific operation condition of the specific communication function selected by the communication function selecting means according to the user's intention to reset the specific communication function of the radio communication performing means to the specific operation condition under the control of the mode change control means, the specific communication function of the radio communication performing means being set to the particular operation condition stored in the operation condition storing means under the control of the mode change control means in cases where the specific operation mode is again selected by the mode selecting means.

6. A radio communication apparatus according to claim 1, further comprising:

displaying means for displaying the first operation mode in cases where the first operation mode is selected by the mode selecting means.

7. A radio communication apparatus according to claim 1 in which the mode selecting means is a single mode selecting button, the plurality of modes being cyclically specified in a prescribed order each time the mode selecting button is pushed for a short time, and the first operation mode being selected in cases where the particular operation mode is specified and the mode selecting button is pushed for a long time.

8. A radio communication apparatus, comprising:

storing means for storing a plurality of operation conditions of communication functions corresponding to each of a plurality of operation modes which each are suitable for an environment, said communication functions including an incoming call sound volume function, a received voice volume function and a noise canceling function, said operation conditions of the incoming call sound volume function including a top condition and a low condition, said operation conditions of the received voice volume function including a top condition and an ordinary condition, said operation conditions of the noise canceling function including an on condition and an off condition, said low condition of the incoming call sound volume function, one of said top condition and ordinary condition of the received voice volume function and said on condition of the noise canceling function being stored, as second operation conditions in the plurality of operation conditions, on the storing means so as to correspond to each other, said second operation conditions corresponding to a second operation mode;

mode selecting means for selecting the second operation mode suitable for a particular environment from the operation modes according to a user's intention;

mode change control means for reading out the second operation conditions corresponding to the second operation mode selected by the mode selecting means from the storing means to set the incoming call sound volume function to the low condition of the second operation conditions corresponding to the second operation mode, to set the received voice volume function to one of the top condition and ordinary condition thereof corresponding to the second operation condition and to set the noise canceling function to the on condition thereof corresponding to the second operation mode;

radio communication signal receiving means for receiving a radio communication signal from a caller;

an incoming call informing unit for outputting a sound at a low volume to inform the user of an incoming call reproduced from the radio communication signal according to the incoming call sound volume function set to the low condition by the mode change control means;

a received voice outputting unit for outputting a caller's voice reproduced from the radio communication signal at a top sound volume in cases where the received voice volume function is set to the top condition by the mode change control means; and a noise canceling unit for reducing a noise mixing with the user's voice according to the noise canceling function set to the on condition by the mode change control means.

9. A radio communication apparatus according to claim 8 in which the caller's voice reproduced from the radio communication signal is output at an ordinary volume by the received voice outputting unit in cases where the received voice volume function is set to the ordinary condition by the mode change control means.

10. A radio communication apparatus, comprising:

storing means for storing a plurality of operation conditions of communication functions corresponding to each of a plurality of operation modes which each are suitable for an environment, said communication functions including an incoming call sound volume function, a received voice volume function and an incoming call vibration function, said operation conditions of the incoming call sound volume function including a top condition and a low condition, said operation conditions of the received voice volume function including a top condition and an ordinary condition, said operation conditions of the incoming call vibration function including an on condition and an off condition, said top condition of the incoming call sound volume function, said top condition of the received voice volume function and said on condition of the incoming call vibration function being stored, as third operation conditions in the plurality of operation conditions, on the storing means so as to correspond to each other, said third operation conditions corresponding to a third operation mode;

mode selecting means for selecting the third operation mode suitable for a particular environment from the operation modes according to a user's intention;

mode change control means for reading out the third operation conditions corresponding to the third operation mode selected by the mode selecting means from the storing means to set the incoming call sound volume function to the top condition of the third operation conditions corresponding to the third operation mode, to set the received voice volume function to the top condition thereof corresponding to the third operation mode and to set the incoming call vibration function to the on condition thereof corresponding to the third operation mode;

radio communication signal receiving means for receiving a radio communication signal from a caller;

an incoming call informing unit for outputting a sound at a top volume to inform the user of an incoming call reproduced from the radio communication signal according to the incoming call sound volume function set to the top condition by the mode change control means;

a received voice outputting unit for outputting a caller's voice reproduced from the radio communication signal at a top sound volume according to the received voice volume function set to the top condition by the mode change control means; and a vibrator actuating circuit for vibrating a vibrator to inform the user of an incoming call reproduced from the radio communication signal received by the radio communication signal receiving means according to the incoming call vibration function set to the on condition by the mode change control means.

11. A radio communication apparatus, comprising:

storing means for storing a plurality of operation conditions of communication functions corresponding to each of a plurality of operation modes which each are suitable for an environment, said communication functions including an incoming call vibration function and a received voice volume function, said operation conditions of the incoming call vibration function including an on condition and an off condition, said operation conditions of the received voice volume function including a top condition and an ordinary condition, said on condition of the incoming call vibration function and said ordinary condition of the received voice volume function being stored, as fourth operation conditions in the plurality of operation conditions, on the storing means so as to correspond to each other, said fourth operation conditions corresponding to a fourth operation mode;

mode selecting means for selecting the fourth operation mode suitable for a particular environment from the operation modes according to a user's intention;

mode change control means for reading out the fourth operation conditions corresponding to the fourth operation mode selected by the mode selecting means from the storing means to set the incoming call vibration function to the on condition of the fourth operation conditions corresponding to the fourth operation mode and to set the received voice volume function to the ordinary condition thereof corresponding to the fourth operation mode;

radio communication signal receiving means for receiving a radio communication signal from a caller;

an incoming call informing unit for vibrating a vibrator to inform the user of an incoming call reproduced from the radio communication signal received by the radio communication signal receiving means according to the incoming call vibration function set to the on condition by the mode change control means; and a received voice outputting unit for outputting a caller's voice reproduced from the radio communication signal at an ordinary sound volume according to the received voice volume function set to the ordinary condition by the mode change control means.

12. A radio communication apparatus, comprising:

storing means for storing in advance a plurality of operation conditions of communication functions corresponding to each of a plurality of operation modes which each are suitable for a predetermined environment, said communication functions including an incoming call vibration function and a noise canceling function, said operation conditions of the incoming call vibration function including an on condition and an off condition, said operation conditions of the noise canceling function including an on condition and an off condition, one of said on condition and off condition of the incoming call vibration function and one of said on condition and off condition of the noise canceling function being stored, as fifth operation conditions in the plurality of operation conditions, on the storing means so as to correspond to each other, said fifth operation conditions corresponding to a fifth operation mode;

setting means for setting by a user's intension a plurality of user operation conditions of the communication functions, which each are suitable for a user's environment, so that the set user operation conditions are stored on the storing means so as to correspond to each other, said user operation conditions of the incoming call vibration function being set to one of said on condition and an off condition, said user operation conditions of the noise canceling function being set to one of said on condition and off condition, said user's operation conditions corresponding to a user operation mode;

mode selecting means for selecting the user mode or the fifth operation mode according to a user's intention;

mode change control means for reading out the user operation conditions or the fifth operation conditions corresponding to the selected operation mode selected by the mode selecting means from the storing means to set the incoming call vibration function to one of the on condition and the off condition corresponding to the user operation conditions of the user operation mode or corresponding to the fifth operation conditions of the fifth operation mode, and to set the noise canceling function to one of the on condition and off condition corresponding to the user operation conditions of the user operation mode or corresponding to the fifth operation conditions of the fifth operation mode;

radio communication signal receiving means for receiving a radio communication signal from a caller;

an incoming call informing unit for vibrating, in cases where the incoming call vibration function is set to the on condition by the mode change control means, a vibrator to inform the user of an incoming call reproduced from the radio communication signal received by the radio communication signal receiving means; and a noise canceling unit for reducing, in cases where the noise canceling function is set to the on condition by the mode change control means, a noise mixing with the user's voice.

* * * * *